ELECTRONIC SWITCHING DEVICES

Filed April 16, 1951

INVENTOR
STANISLAS VAN MIERLO

BY Robert Harding Jr.
ATTORNEY

Patented Nov. 18, 1952 2,618,753

UNITED STATES PATENT OFFICE 2,618,753

ELECTRONIC SWITCHING DEVICE

Stanislas Van Mierlo, Antwerp, Belgium, assignor to International Standard Electric Corporation, New York, N. Y., a corporation of Delaware Application April 16, 1951, Serial No. 221,157
In France April 14, 1950

5 Claims. (Cl. 307—115)

The present invention relates to electronic switching devices and more particularly to such devices utilizing rectifying cells such as germanium diodes.

An electronic switching device using rectifying cells constitutes a device analogous to an electrical contact, that is to say, to a device the attenuation of which can have any one of the two values "0" and "infinity." In fact electronic switching devices of the above mentioned type provide an attenuation variable according to the inherent characteristics of the rectifying cells used but never reach the values 0 or infinity. It is obviously of interest to provide switches for which the ratio between the maximum attenuation and the minimum attenuation is as great as possible.

One of the objects of the present invention is to provide an electronic switch utilizing rectifying cells such as germanium diodes in which the ratio between the maximum and the minimum attenuations is greater than in the case of switches of the type at present in use.

According to another feature of the invention an electronic switch comprises, in combination, two terminals connected respectively to ground through an impedance, a pair of rectifying cells oppositely connected between the said two terminals, a terminal connected to a common point to the said two rectifying cells by an impedance, means adapted to bring the said terminal to a positive or negative potential of suitable value, a second pair of rectifying cells oppositely connected between the said two terminals in parallel with the first pair of rectifying cells and in the same direction, associated with means adapted for carrying the point common to the second pair of rectifying cells to a suitable potential, the direction of the said rectifying cells and the value and the direction of the said potential being chosen in order that the said switch produces on the signals transmitted between the said two terminals a high or a low attenuation according to the direction of the potential of the said terminal connected to a common point to the first pair of rectifying cells.

Other objects, features and advantages of the present invention will appear from a reading of the following description of an embodiment utilizing features of the invention, the said description being given in connection wtih the accompanying drawings in which.

Figures 1, 2, 3:
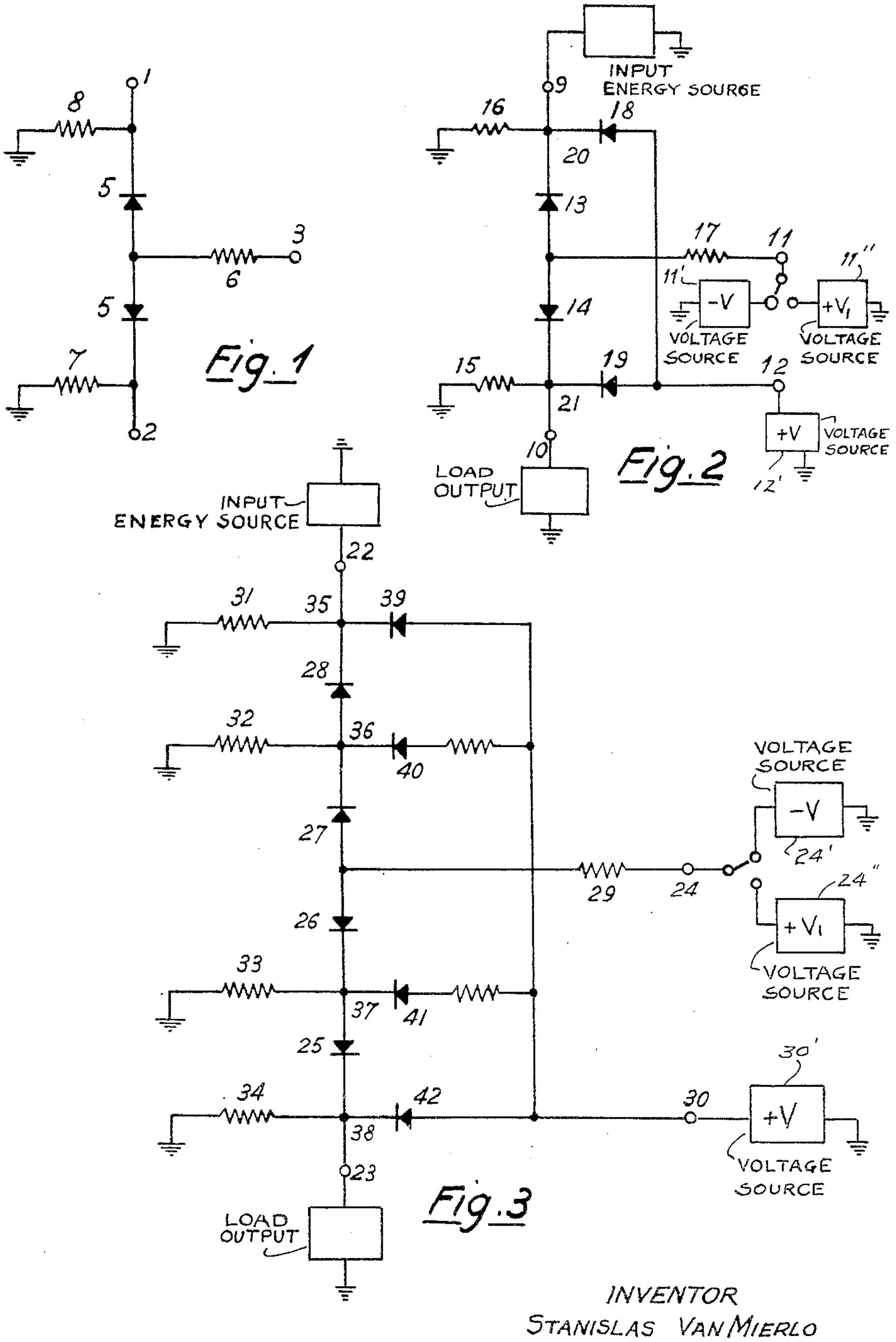
Fig. 1 represents a known electronic switching device utilizing rectifying cells such as germanium diodes.
Fig. 2 represents an electronic switch incorporating features of the present invention.
Fig. 3 represents an alternative of the device shown in Fig. 2.

It will be assumed that the signals, the maximum amplitude of which is V, are transmitted between terminal 1 and terminal 2 (Fig. 1). If terminal 3 is carried to a positive potential with respect to ground, equal or greater than V, a current flows between terminal 3 and ground through the rectifying cells 4 and 5 and the impedances 6, 7 and 8. In this case, the signals are subjected between terminals 1 and 2 only to a small attenuation. If terminal 3 is carried to a potential equal or greater than V in absolute value and negative with respect to ground, no current will flow through the rectifying cells 4 and 5 and the signals are subjected between terminals 1 and 2 to a high attenuation. Under certain circumstances of operation, it is interesting to provide a ratio as great as possible between the maximum and minimum attenuations provided for the signals by the circuit shown in Fig. 1. On the other hand the portion of the signals passing towards terminal 3, in the case in which the attenuation is a minimum, may be reduced by giving to impedance 6, which may, for instance, be a self inductance, a suitable value.

Fig. 2 represents an electronic switch capable of transmitting electrical signals between terminals 9 and 10. If there is applied a negative voltage with respect to ground (—V) from a source 11′ to terminal 11 and positive voltage with respect to ground (+V) from a source 12′ to terminal 12, it is easy to see that no current will flow between terminal 11 and ground through the rectifying cells 13 and 14 and the impedances 15, 16 and 17, and the cells 13 and 14 provide a high impedance for the passage of electrical signals between terminals 9 and 10. On the other hand, a current flows between terminal 12 and ground through rectifying cells 18 and 19 and impedances 15 and 16; in view of this the signals sent either from terminal 9 or from terminal 10 are free to pass towards terminal 12 and to ground through source 12′, the rectifying cells 18 and 19 offering them a low impedance. The attenuation obtained by means of the electronic switch circuit represented by Figure 1 is therefore increased due to the absorption of the signals towards terminal 12 through the rectifying cells 18 and 19 which in this case offer a low impedance. If there is applied a positive potential $V_1$ from the source 11″ to terminal 11 which potential is positive with respect to ground ($V_1$ being greater than V) a current flows between terminal 11 and ground through the rectifying cells 13 and 14 and the impedances 15, 16 and 17; points 20 and 21 are then positive with respect to ground and if the values of the impedances 15, 16 and 17 and the value of potential $V_1$ have been chosen in a suitable way, the potential of points 20 and 21 is then greater than the potential V of terminal 12. In this case no current flows between terminal 12 and ground through the rectifying cells which then present a high impedance. The electrical signals transmitted between terminal 9 and terminal 10 are subjected only to a low attenuation, and the ratio between the maximum attenuation and the minimum attenuation is greater with respect to the said attenuations obtained by means of the electronic switching circuit represented in Figure 1.

It is possible to make electronic switches based on the same principle and utilizing a larger number of rectifying cells and for which the ratio between the maximum and minimum attenuations is still more improved.

Figure 3 represents an embodiment of such an electronic switch adapted for transmitting electrical signals between terminals 22 and 23. If terminal 24 is at a negative potential −V with respect to ground from the source 24′ and terminal 30 at a positive potential +V with respect to ground from the source 30′, a current will flow between terminal 30 and ground through impedances 31, 32, 33, 34 and rectifying cells 39, 40, 41 and 42 which offer a low impedance for the passage of signals towards terminal 30 and to ground through source 30′; on the other hand no current will flow through the rectifying cells 25, 26, 27 and 28, provided that the potential of terminal 30 and the value of the impedances 31, 32, 33 and 34 have been chosen in such a way that, on the one hand, the potential of point 35 is greater than the potential of point 36 and that, on the other hand, the potential of point 38 is greater than the potential of point 37.

There is, as in the case of the circuit shown in Fig. 2 a high impedance which is opposed to the passage of the signals either from terminal 22 to terminal 23 or from terminal 23 to terminal 22, while a low shunt impedance is provided which permits shunting signals transmitted from terminal 22 or from terminal 23 towards terminal 30 and thus to ground through source 30′. If terminal 24 is carried to a positive potential by connecting to the source 24″, a current will flow between terminal 24 and ground through the impedance 29, 31, 32, 33 and 34 and the rectifying cells 25, 26, 27 and 28 which then offer a low impedance to the passage of the signals between terminals 22 and 23; on the other hand if the positive potential applied to terminal 24 from source 24″ is chosen in a suitable way, points 35, 36, 37 and 38 are at a positive potential greater than the potential of terminal 30 and no current will then flow through the rectifying cells 39, 40, 41 and 42 which then offer a high impedance between terminals 22 and 23 and terminal 30.

There is thus obtained between terminals 22 and 23 series rectifiers offering low impedances and shunt rectifiers offering high impedances.

While the principles of the invention have been described above in connection with specific embodiments, and particular modifications thereof, it is to be clearly understood that this description is made only by way of example and not as a limitation on the scope of the invention.

What is claimed is that:

1. Switching means for controlling energy transfer between an energy source and a load comprising, in combination, a first pair of asymmetrically conducting devices connected in series between said energy source and said load, the two said asymmetrically conducting devices having their like electrodes connected together, a second pair of asymmetrically conducting devices connected in series between said source and said load, the two last-mentioned asymmetrically conducting devices having their like electrodes connected together, the same electrodes being connected together in both pairs, a resistor connected to the junction point of said first pair, a first voltage source connected between the other end of said resistor and ground, and a second voltage source connected directly between the junction point of said second pair and ground.

2. Switching means, according to claim 1, further comprising a second resistor connected between said energy source and ground and a third resistor connected between said load and ground.

3. Switching means, according to claim 2, further comprising a third voltage source of a predetermined value, and means to replace the first source with said third source.

4. Switching means, according to claim 3, in which the potential of the first source is opposite in sign from that of the second source and the potential of the third source is the same sign as said second source but greater in value.

5. Switching means, according to claim 4, in which each asymmetrically conducting device of the first pair includes a pair of series connected asymmetrically conducting devices, poled in the same direction, a resistance connected between the junction point of each pair of said devices and ground, and further comprising a resistance and an asymmetrically conductive device connected between each said junction point and the second voltage source, said last-mentioned devices being connected to said junction points and being poled in the same direction with respect to said second voltage source as the second pair of devices.

STANISLAS VAN MIERLO.

REFERENCES CITED

The following references are of record in the file of this patent:

UNITED STATES PATENTS

| Number | Name | Date |
|---|---|---|
| 2,535,303 | Lewis | Dec. 26, 1950 |
| 2,576,026 | Meacham | Nov. 20, 1951 |